2,817,623

TABERNANTHINE, IBOGAINE CONTAINING ANALGESIC COMPOSITIONS

Jurg Adolf Schneider, Summit, N. J., assignor to Ciba Pharmaceutical Products, Inc., Summit, N. J., a corporation of New Jersey No Drawing. Application March 22, 1956
Serial No. 573,099

6 Claims. (Cl. 167—67)

This invention relates to analgesic compositions containing indole alkaloids of the family Apocynaceae, and to methods for preparing and using such compositions.

Among the alkaloidal substances found in the roots of the plant *Tabernanthe iboga* are ibogaine and tabernanthine. Shortly after the isolation of ibogaine, at the turn of the 20th century, [Dybowski and Landrin, in C. R. Ac. Sc. 133:748 (1901); Haller and Heckel C. R. Ac. Sc. 133:850 (1901); Landrin Bull. Sc. Pharm. 11:319 (1905)] the drug was reported as producing a peculiar type of excitation, followed by apathy associated with paralysis of the legs. Later it was found to possess local anaesthetic properties and, because of its ability to stimulate the central nervous system, it was recommended for the treatment of trypanosomiasis. Still later it was reported as causing choline esterase inhibition, producing hypotension in the anaesthetized dog, antagonism to the carotid occlusion reflex, and inhibitory effects on intestinal motility.

Tabernanthine—like ibogaine, is an indole alkaloid and is a component of the total alkaloids of the plant *Tabernanthe iboga*. (Delourame-Houde, doctoral thesis presented to the faculty of the University of Paris 1944; publicly available under the title "Etude de l'Iboga.") In average doses this alkaloid effectively stimulates the central nervous system without producing increased motility or other undesirable side effects. Indeed, the central nervous system stimulation is characterized by a state of increased alertness without increased spontaneous motor activity.

One of the undesirable side effects of morphine and similar analgesic drugs is depression of respiration. Because of these side effects the administration of such valuable analgesics must, in some cases, either be minimized or completely withheld. This is not altogether desirable since morphine and various alkaloids related to it are, at times, the only drugs which can effectively produce analgesia. Another factor to be considered is that of addiction. When drugs such as morphine are administered to a chronically ill patient, it is desirable to maintain a state of analgesia over an extended period of time. Under these circumstances, it is quite common for the patient to become sensitized to the drug, requiring greater and greater doses with the passage of time.

During recent years many attempts have been made to find synthetic drugs which possess all of the desirable attributes of morphine and similar drugs without their attendant toxic effects. Some effort has also been made to synthesize compounds which are structurally related to morphine but do not contain toxic substituents. Here, too, the degree of success achieved has been minimal.

It has now been found that a combination comprising an indole alkaloid of the family Apocynaceae such as ibogaine or tabernanthine, and morphine produces unexpected and surprising results following parenteral or oral administration. Not only is the dose required for producing analgesia considerably reduced but, more importantly, the indole alkaloid component exerts a potentiating and prolonging effect upon the analgesic component. Such potentiation and prolongation of analgesia are completely unpredictable and surprising manifestations. The net effect of the synergism between ibogaine or tabernanthine and narcotics of the morphine series is that the latter can be administered safely in small doses, thus minimizing the toxic side reactions while at the same time imparting the desired analgetic effect.

The exact mechanism or cause of potentiating activity is unknown but the effects are readily observable. The unexpectedness is further emphasized by the fact that a combination of this kind would normally be expected to be limited to a simple counteracting effect upon the hypnotic properties of morphine. Yet, on the contrary, the physiological activity observed goes far beyond this simple limitation. Since neither ibogaine nor tabernanthine per se do not have analgesic properties, it is reasonable to state that the net effect of the combination is potentiating with respect to the analgetic component. As a result, it is possible to reduce the average required dose of morphine, e. g. from 10 mg. to 5 mg., and induce, in addition, analgesia which lasts considerably longer and is more pronounced than that obtained with the average dose.

The combination within the scope of this application with respect to the analgetic component is not limited to morphine. It is intended that morphine derivatives and other substances having morphine-like activity be included as components of the combination, as for example, codeine, codeine derivatives, pantopon, dihydromorphinone, methyl dihydromorphinone, ethyl morphine, dihydrocodeinone, dihydromorphine, dihydro-desoxymorphine-D, dihydro-desoxycodeine-D, 4-(m-hydroxyphenyl)-1-methyl-4-piperidyl ethyl ketone (ketobemidon), ethyl-1-methyl-4-phenyl piperidine-4-carboxylate (meperidine), d,l-3-methoxy-N-methylmorphinan, d,l-3-hydroxy-N-methylmorphinan and therapeutically active salts thereof, e. g. hydrochlorides, sulfates, etc.

The ratio of indole alkaloid e. g. ibogaine or tabernanthine: morphine or morphine-like substances which is most suitable for obtaining the desired synergistic effect, appears to be from about 20:1 to about 0.5:1, the optimal limits being from 2:1 to 4:1. The dose administered will vary widely depending upon the age, weight and condition of the patient as well as the character of the analgetic component. Thus, in the case of morphine, a quantity of about 5 mg. of morphine and 10 to 20 mg. of ibogaine would appear to be adequate. The drugs may be administered in combination, in a single unitary dosage form, simultaneously each in a separate dosage form, or successively—for example, a dose of morphine followed by a dose of ibogaine in the same or different site of injection.

Depending upon the nature of the analgetic component employed, the indole alkaloid may either potentiate the degree of analgesia obtainable with the analgesic component per se or it may induce analgesia at dose levels where no analgesia is obtainable if the drug per se is administered. For example, ketobemidon shows a significant degree of analgesia in doses of 5 mg. If this dose is combined with 20 mg. of ibogaine, there is a marked potentiation of analgetic effect. Codeine, on the other hand, shows only extremely weak analgetic effects in doses of 10 mg. but when combined with 20 to 40 mg. of ibogaine or tabernanthine it shows a significant degree of analgesia. In doses of 25 mg. meperidine (as the hydrochloride) shows only a weak analgetic effect, but when combined at this dose level with 20–40 mg. of ibogaine or tabernanthine there is a marked potentiation of analgesia.

In preparing suitable, physiologically acceptable dosage unit forms, any one of a wide variety of preparations may be compounded, as, for example, tablets, capsules, pills, solutions, powders, etc. In addition to the active ingredient, there may be present additional substances commonly employed in the pharmaceutical art for preparing therapeutic compositions, as for example, excipients, binders, fillers and other inert ingredients. Where an injectable aqueous solution is desired, the alkaloids may be used in the form of their salts, such as hydrochlorides, sulfates or nitrates.

A convenient oral form for administration is the tablet, capsule or pill. A compressed tablet containing 10 mg. of ibogaine and 5 mg. of morphine is convenient for administration. The fillers and binders which are commonly employed in the art of tablet compression may be used in formulating the tablets. As examples of these may be given corn starch, lactose, stearic acid, talc, magnesium stearate, etc. The quantities of these ingredients may vary widely in accordance with the dictates of those skilled in the art and would depend largely upon the size and kind of tablet, i. e. soft or hard, which is required.

As specific examples of formulations suitable for administration may be given the following:

Example 1

5 gm. of morphine sulfate is dissolved in 500 ml. of purified water and 10 gm. of ibogaine hydrochloride are added. The mixture is stirred, a sufficient quantity of purified water is added to make a volume of 1 liter and the solution is filtered. The solution is sterilized and filled into sterile ampuls in accordance with techniques commonly employed in the pharmaceutical art.

Example 2

150 mg. of morphine sulfate are mixed with 300 mg. of ibogaine hydrochloride and triturated with 5.0 gm. of milk sugar. The mixture is divided into 10 equal dosage forms and administered orally as a powder.

Example 3

30 gm. of codeine sulfate is dissolved in 500 ml. of purified water and 30 gm. of ibogaine hydrochloride are added. The mixture is stirred, a sufficient quantity of purified water is added to make a volume of 1 liter and the solution is filtered. The solution is sterilized and filled into sterile ampuls, in accordance with techniques commonly employed in the pharmaceutical art.

Example 4

2 gm. of ketobemidon hydrochloride is dissolved in 500 ml. of purified water and 20 gm. of ibogaine hydrochloride are added. The mixture is stirred, a sufficient quantity of purified water is added to make a volume of 1 liter and the solution is filtered. The solution is sterilized and filled into sterile ampuls, in accordance with techniques commonly employed in the pharmaceutical art.

Example 5

2 gm. of morphine sulfate are mixed with 8 gm. of ibogaine hydrochloride and the mixture is triturated with 3 gm. of tragacanth and then with 138 gm. of lactose in divided portions. The mass is granulated with 28 ml. of 50 percent alcohol and passed through a No. 10 screen. The granulation is dried and passed through a screen of suitable mesh, following which 4 gm. each of talcum and corn starch and 0.7 gm. of magnesium stearate are worked in. The mixture is sifted and compressed with a punch of suitable size to make tablets containing 2 mg. of morphine sulfate and 8 mg. of ibogaine hydrochloride.

Example 6

40 gm. of meperidine hydrochloride is dissolved in 500 ml. of purified water and 20 gm. of ibogaine hydrochloride are added. The mixture is stirred, a sufficient quantity of purified water is added to make a solution having a volume of 1 liter and the solution is filtered. The solution is sterilized and filled into sterile ampuls, in accordance with techniques usually employed in the pharmaceutical art.

Example 7

5 gm. of morphine sulfate is dissolved in 500 ml. of purified water and 10 gm. of tabernanthine hydrochloride are added. The mixture is stirred, a sufficient quantity of purified water is added to make a volume of 1 liter, and the solution is filtered. The solution is sterilized and filled into ampuls in accordance with techniques usually employed in the pharmaceutical art.

Example 8

150 mg. of morphine sulfate are mixed with 300 mg. of tabernanthine hydrochloride and triturated with 5.0 g. of milk sugar. The mixture is divided into 10 equal dosage forms and administered orally as a powder.

Example 9

30 gm. of codeine sulfate is dissolved in 500 ml. of purified water and 30 gm. of tabernanthine hydrochloride are added. The mixture is stirred, filtered and sufficient quantity of purified water is added to make a volume of 1 liter and the solution is filtered. The solution is sterilized and filled into sterile ampuls, in accordance with techniques usually employed in the pharmaceutical art.

Example 10

2 gm. of ketobemidon hydrochloride is dissolved in 500 ml. of purified water and 20 gm. of tabernanthine hydrochloride are added. The mixture is stirred, filtered and sufficient quantity of purified water is added to make a solution having a volume of 1 liter and the solution is filtered. The solution is sterilized and filled into sterile ampuls in accordance with techniques known in the pharmaceutical art.

Example 11

2 gm. of morphine sulfate are mixed with 8 gm. of tabernanthine hydrochloride and the mixture is triturated with 3 gm. of tragacanth and then with 138 gm. of lactose in divided portions. The mass is granulated with 28 ml. of 50 percent alcohol and passed through a No. 10 screen. The granulation is dried thoroughly without heat and passed through a screen of suitable mesh, following which 4 gm. each of talcum and corn starch and 0.7 gm. of magnesium stearate are worked in. The mixture is sifted and compressed with a punch of suitable size to make tablets containing 2 mg. of morphine sulfate and 8 mg. of tabernanthine hydrochloride.

Example 12

40 gm. of meperidine hydrochloride are dissolved in 500 ml. of distilled water and 20 gm. of tabernanthine hydrochloride are added. The mixture is stirred, filtered and sufficient quantity of distilled water is added to make a volume of 1 liter and the solution is filtered. The solution is sterilized and filled into sterile ampuls in accordance with techniques known in the pharmaceutical art.

What is claimed is:

1. A new analgesic composition containing a member selected from the group consisting of morphine, codeine, dihydromorphinone, methyl-dihydromorphinone, pantopon, ethylmorphine, ketobemidon, meperidine, dihydrocodeinone, dihydromorphine, dihydro-desoxymorphine-D, dihydro-desoxycodeine - D, d,l-3-methoxy-N-methylmorphinan, d,l-3-hydroxy-N-methylmorphinan and the therapeutically active salts thereof and an indole alkaloid selected from the group consisting of ibogaine, tabernanthine and their therapeutically active salts, the ratio between the indole alkaloid:morphine components being from about 0.5 to about 20.0, to 1.

2. A new analgesic composition containing a member selected from the group consisting of morphine, codeine, dihydromorphinone, methyl - dihydromorphinone, pantopon, ethylmorphine, ketobemidon, meperidine, dihydrocodeinone, dihydro morphine, dihydro-desoxymorphine-D, dihydro-desoxycodeine-D, d,l-3-methoxy-N-methylmorphinan, d,l-3-hydroxy - N - methylmorphinan and the therapeutically active salts thereof and an indole alkaloid selected from the group consisting of ibogaine, tabernanthine and their therapeutically active salts, the ratio between the indole alkaloid:morphine components being from about 2:1 to about 4:1.

3. A method for combatting pain which comprises administering to a living animal a composition comprising a ratio of from about 0.5 to about 20.0 parts of an indole alkaloid selected from the group consisting of ibogaine, tabernanthine and therapeutically active salts thereof to about 1 part of a narcotic component selected from the group consisting of morphine, codeine, dihydromorphinone, methyl-dihydromorphinone, pantopon, ethylmorphine, ketobemidon, meperidine, dihydrocodeinone, dihydro-morphine, dihydro-desoxymorphine-D, dihydro-desoxycodeine-D, d,l-3-methoxy-N-methylmorphinan, d,l-3-hydroxy-N-methyl morphinan and therapeutically active salts thereof.

4. A composition of matter comprising a therapeutically active salt of ibogaine in admixture with a therapeutically active salt of morphine in a pharmaceutical carrier the ratio between the ibogaine salt and the morphine salt being from about 0.5 to about 20.0, to 1.

5. A composition of matter comprising a therapeutically active salt of tabernanthine in admixture with a therapeutically active salt of morphine in a pharmaceutical carrier the ratio between the tabernanthine salt and the morphine salt being from about 0.5 to about 20.0, to 1.

6. A new analgesic composition wherein an indole alkaloid selected from the group consisting of ibogaine, tabernanthine and the therapeutically active salts thereof is present in admixture with a narcotic component selected from the group consisting of morphine, codeine, dihydromorphinone, methyldihydromorphinone, pantopon, ethylmorphine, ketobemidon, meperidine, dihydrocodeinone, dihydro-morphine, dihydrodesoxymorphine-D, dihydro - desoxycodeine-D, d,l-3-methoxy-N-methylmorphinan, d,l-3-hydroxy-N-methylmorphinan and therapeutically active salts thereof said composition containing the indole alkaloid and the narcotic component in proportion substantially corresponding to the ratio of 1 part by weight of narcotic component to from about 0.5 part by weight to about 4.0 parts by weight of indole alkaloid.

References Cited in the file of this patent

Schlittler et al.: Helv. Chimica Acta, 36: Fasc. 16, pp. 1337–1344, No. 168, 1953.